(12) United States Patent
Camboni

(10) Patent No.: US 12,110,180 B2
(45) Date of Patent: Oct. 8, 2024

(54) MOVEMENT DEVICE

(71) Applicant: SYSTEM LOGISTICS S.P.A., FIORANO MODENESE (IT)

(72) Inventor: Massimiliano Camboni, Castelfranco Emilia (IT)

(73) Assignee: SYSTEM LOGISTICS S.P.A., Fiorano Modenese (IT)

( * ) Notice: Subject to any disclaimer, the term of this patent is extended or adjusted under 35 U.S.C. 154(b) by 239 days.

(21) Appl. No.: 17/777,661

(22) PCT Filed: Jan. 7, 2021

(86) PCT No.: PCT/IB2021/050089
§ 371 (c)(1),
(2) Date: May 18, 2022

(87) PCT Pub. No.: WO2021/140456
PCT Pub. Date: Jul. 15, 2021

(65) Prior Publication Data
US 2023/0012915 A1 Jan. 19, 2023

(30) Foreign Application Priority Data
Jan. 9, 2020 (IT) .......................... 102020000000247

(51) Int. Cl.
*B65G 1/04* (2006.01)
(52) U.S. Cl.
CPC ......... *B65G 1/0492* (2013.01); *B65G 1/0435* (2013.01)
(58) Field of Classification Search
CPC ..................................................... B65G 1/0435
(Continued)

(56) References Cited

U.S. PATENT DOCUMENTS 4,993,905 A 2/1991 Potocnjak
5,839,872 A * 11/1998 Goto .................... B65G 1/0435
414/280

(Continued)

FOREIGN PATENT DOCUMENTS

CN 110615378 A 12/2019
DE 3545298 A1 7/1987
(Continued)

*Primary Examiner* — Mark C Hageman
(74) *Attorney, Agent, or Firm* — PEARNE & GORDON LLP

(57) ABSTRACT

Vehicle (S), provided with a loading space (L), which comprises a movement device (M1), comprising: a support body (F); a barrier (1), associated with the support body (F) and movable between an active position, in which it protrudes from the support body (F) to interact with an object to be displaced, and an inactive position, in which it is not able to interact with an object to be displaced: a first connecting rod (10), associated with the support body (1) rotatably about a first axis of rotation (X1); a second connecting rod (20), associated with the support body (1) rotatably about a second axis of rotation (X2) parallel to the first axis of rotation (X1); an arm (30), rotatably connected to the first connecting rod (10) and the second connecting rod (20) at a third axis of rotation (X3) and at a fourth axis of rotation (X4) rotatably parallel to the first and the second axis of rotation (X1,X2); wherein the distance between the first axis of rotation (X1) and the third axis of rotation (X3) is equal to the distance between the second axis of rotation (X2) and the fourth axis of rotation (X4).

10 Claims, 4 Drawing Sheets

(58) Field of Classification Search
USPC .......................................................... 414/280
See application file for complete search history.

(56) References Cited

U.S. PATENT DOCUMENTS

| | | | |
|---|---|---|---|
| 8,596,952 B2 * | 12/2013 | Wolkerstorfer ...... | B65G 1/0435 |
| | | | 414/280 |
| 9,718,617 B2 * | 8/2017 | Koide .................. | B65G 1/0435 |
| 9,994,394 B2 * | 6/2018 | Masuda ................ | B65G 1/0421 |
| 10,618,732 B2 * | 4/2020 | Iwata ................... | B65G 41/003 |
| 11,634,278 B2 * | 4/2023 | Kimura ................ | B65G 1/0492 |
| | | | 414/266 |
| 2018/0134488 A1 | 5/2018 | Grosse et al. | |

FOREIGN PATENT DOCUMENTS

| | | |
|---|---|---|
| DE | 102015202141 A1 | 8/2016 |
| EP | 0353556 A1 | 2/1990 |
| WO | 2016168874 A1 | 10/2016 |

\* cited by examiner

MOVEMENT DEVICE

The present invention relates to a vehicle provided with a movement device.

The vehicle according to the present invention is provided with a movement device particularly suitable for the displacement by interference and dragging of loose packages, boxes, cartons or other containers, in the context of systems or machinery for logistical goods management.

The invention relates in particular, but not exclusively, to a vehicle capable of displacing itself along a predetermined path, controllable autonomously and/or manually, within a storage system. In a first example, the vehicle could be in the form of a shuttle, movable along a path lying on a substantially horizontal plane. In a second example, the vehicle could be in the form of an elevator, i.e., in the form of a platform movable along a vertical path, to reach different overlapping levels of an automated warehouse.

Vehicles are currently available provided with movement devices which comprise a support body, movable along a direction of displacement. One or more movable barriers are associated with the support body. Each barrier is movable between an active position, in which it protrudes from the support body to interact with an object to be displaced, and an inactive position, in which it is not able to interact with an object to be displaced. When the barrier is in the active position, it is possible to transmit the translation of the support body along the direction of displacement to an object placed in a position such as to interfere with the barrier in the active position. When the barrier is in the inactive position, the translation of the support body is not transferred to the object placed in the same position mentioned above. This allows, for example, to implement a forward stroke of the support body, with the barrier in an inactive position, to bring the barrier on one side of the object without interfering therewith. At the end of the forward stroke, it is possible to bring the barrier into the active position and, in this condition, perform a return stroke of the support body, in the direction opposite the forward stroke. In the active position, the barrier interferes with the object, causing it to displace integrally with the support body along at least a section of the return stroke.

In the vehicles currently available, the barriers are in the form of rods or bars having a certain, relatively long length but a relatively small height, measured vertically. This implies that the thrust exerted on the object is distributed over an equally small height of the object itself, which can undergo imbalances or even overturn if the thrust is transmitted at a height of the object which is particularly distant from the height of the object's centre of gravity. To avoid the risk of overturning, it is therefore necessary to include complex mechanisms to adjust the position of the barriers. Such mechanisms, in any case, do not allow sufficiently rapid adjustments to allow the correct movement of objects of different shape and height alternating within the same production cycle.

The aim of the present invention is to overcome the drawbacks of the currently available vehicles.

An advantage of the vehicle according to the present invention is to allow more uniform distribution of the forces necessary for displacement on the objects, limiting or cancelling the risks of overturning the objects themselves.

Another advantage of the vehicle according to the present invention is that of being simple and functional, and able to replace the current vehicles without requiring particularly complex interventions.

Additional features and advantages of the present invention will become more apparent from the following detailed description of one embodiment of the invention, illustrated by way of non-limiting example in the appended figures in which.

Figure 1:
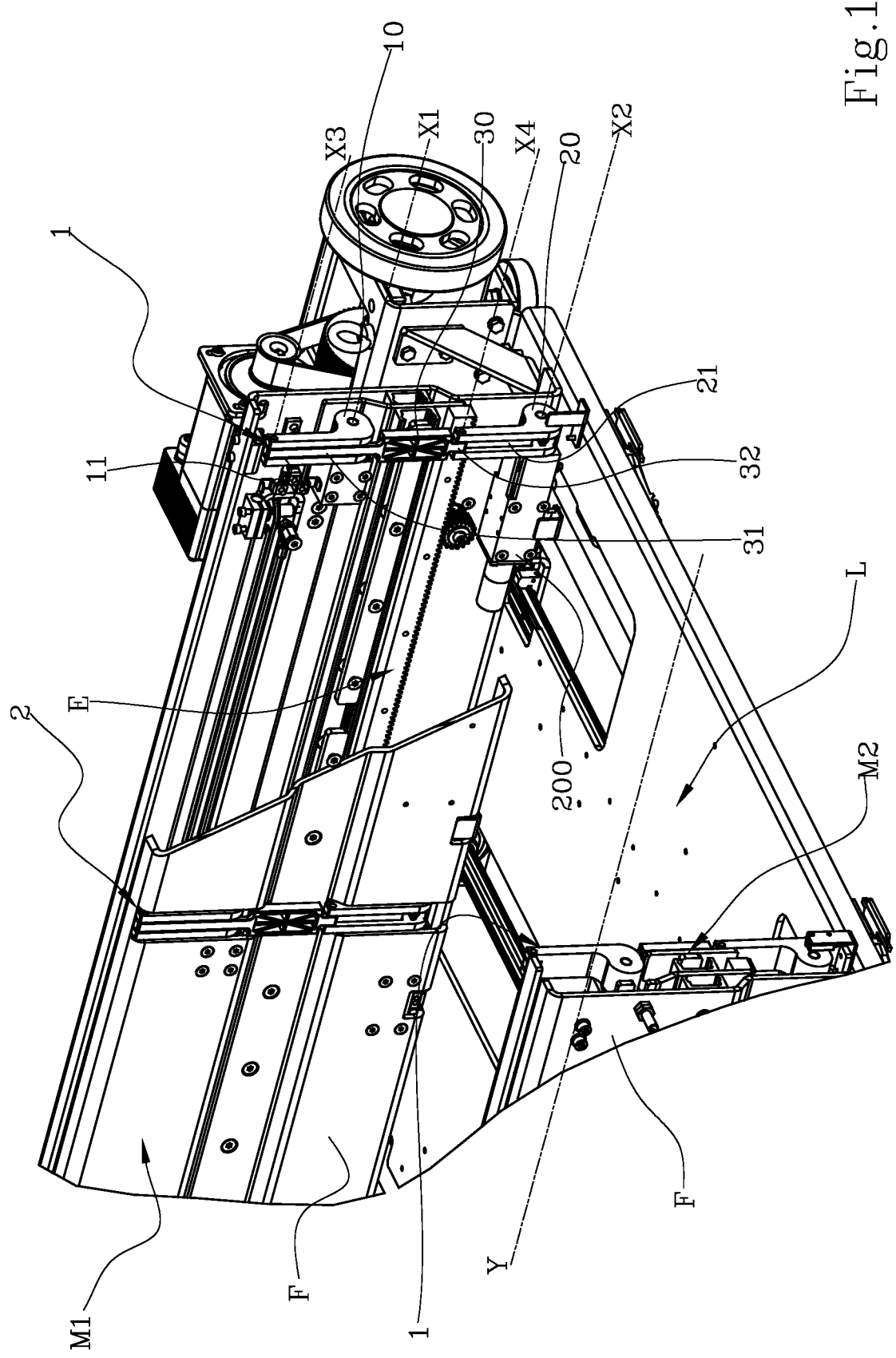
FIG. 1 is an isometric view of a vehicle according to the present invention, provided with a movement device in a first operating configuration.

The movement device (M) comprises at least one support body (F). In the embodiment depicted, the support body is in the form of a shaped plate, but could assume any other form. The support body (F) is movable along a longitudinal direction (Y), by means of a special motor. The longitudinal direction (Y) is substantially the direction along which the displacement of the objects (O1,O2) is required.

A barrier (1) is associated with the support body (F) The barrier (1) is movable between an active position, in which it protrudes from the support body (F) to interact with an object to be displaced, and an inactive position, in which it is not able to interact with an object to be displaced. When the barrier (1) is in the active position, it is possible to transmit the translation of the support body (F) along the longitudinal direction (Y) to an object (O1,O2) placed in a position such as to interfere with the barrier (1) in the active position. When the barrier (1) is in the inactive position, the translation of the support body (F) is not transferred to the object (O1,O2) placed in the same position mentioned above. This allows, for example, to implement a forward stroke of the support body (F), with the barrier (1) in an inactive position, to bring the barrier (1) on one side of the object (O1,O2) without interfering therewith. At the end of the forward stroke, it is possible to bring the barrier (1) into the active position and, in this condition, perform a return stroke of the support body (F), in the direction opposite the forward stroke. In the active position, the barrier (1) interferes with the object (O1,O2), causing it to displace integrally with the support body (F) along at least a section of the return stroke.

The barrier (1) comprises a first connecting rod (10), associated with the support body (1) rotatably about a first axis of rotation (X1). Preferably, but not exclusively, the first axis (X1) is substantially horizontal.

The barrier (1) further comprises a second connecting rod (20), associated with the support body (1) rotatably about a second axis of rotation (X2) parallel to the first axis of rotation (X1).

An arm (30) is rotatably connected to the first connecting rod (10) and the second connecting rod (20) at a third axis of rotation (X3) and at a fourth axis of rotation (X4) respectively parallel to the first and the second axis of rotation (X1,X2). The distance between the first axis of rotation (X1) and the third axis of rotation (X3) is equal to the distance between the second axis of rotation (X2) and the fourth axis of rotation (X4). Thereby, the connecting rods (10,20) and the arm (30) form an articulated parallelogram, in which the connecting rods (10,20) remain parallel to each other and the arm (30) maintains a constant orientation on the plane of rotation perpendicular to the axis of rotation (X1,X2,X3,X4). In particular, the arm (30) maintains a vertical orientation.

A first motor (200) is associated with the first connecting rod (10) and/or the second connecting rod (20) to rotatably operate the first and/or the second connecting rod about the respective axis of rotation (X1,X2) between a rest position and an operating position. Given the articulated parallelogram connection between the connecting rods and the arm, it is sufficient that only one of the connecting rods is rotatably operated by the first motor to obtain the rotation of the other connecting rod and the arm (30). In the embodiment depicted, the first motor (200) is associated with the second connecting rod (20).

In the inactive position, the first connecting rod (10), the second connecting rod (20) and the arm (30) are flanked, in a compact configuration flanked to the support body (F). The inactive position of the barrier (1) is defined in the inactive position of the connecting rods (10,20).

The arm (30) is inclined with respect to the connecting rods (10,20) in the operating position of the connecting rods (10,20). For example, the arm (30) is orthogonal to the connecting rods (10,20) in the operating position of the connecting rods (10,20). In the operating position, the arm (30) assumes a position of maximum distance from the support body (F). In the embodiment depicted, the connecting rods (10,20) are arranged substantially orthogonal to the support body (F), but could also be inclined at a different angle with respect to the support body (F). The active position of the barrier (1) is defined in the operating position of the connecting rods (10,20).

The axes of rotation (X1,X2) can be defined, for example, by pins and rotoidal couplings of various kinds. To implement the rotation of one of the connecting rods (10,20), it is possible, for example, to arrange a motorized shaft integral in rotation with one of the connecting rods (10,20). In the embodiment depicted, the motorized shaft is integral in rotation with the second connecting rod (20). Such a motorized shaft is concentric to the axis of rotation (X1,X2) of the connecting rod (20). The motorized shaft may be connected to the first motor (200) directly or through a transmission known to those skilled in the art.

In the active position of the barrier (1), corresponding to the operating position of the connecting rods (10,20), the arm (30) is totally available for interaction with the object (O1,O2). In other words, the contact between the object (O1,O2) and the barrier (1) occurs at the arm (30) and also at at least a portion of the connecting rods (10,20). The latter is capable of exerting on the object (O1,O2) a uniform and distributed thrust on a section of the object (O1,O2) corresponding to the length of the arm (30). Thereby, the object (O1,O2) remains stable and the risk of overturning is avoided. In other words, the arm (30) and the connecting rods (10,20), in addition to ensuring a greater contact surface with the object (O1,O2) to be moved, also allow to have a support above the point of the centre of gravity of the object itself, giving greater stability during the movement step and preventing the object from overturning.

In the embodiment depicted, the arm (30) has two thinned portions (31,32), aligned along a direction (Z) perpendicular to the axes of rotation (X1,X2). A first thinned portion (31) is pivoted to a first connecting rod (10) about the third axis of rotation (X3). Preferably, but not necessarily, the first thinned portion (31) and the first connecting rod (10) are pivoted together in an end zone.

A second end portion (32) is pivoted to the second connecting rod (20) about the fourth axis of rotation (X4). Preferably, but not necessarily, the second thinned portion (32) and the second connecting rod (20) are pivoted together in an end zone.

Figure 2:
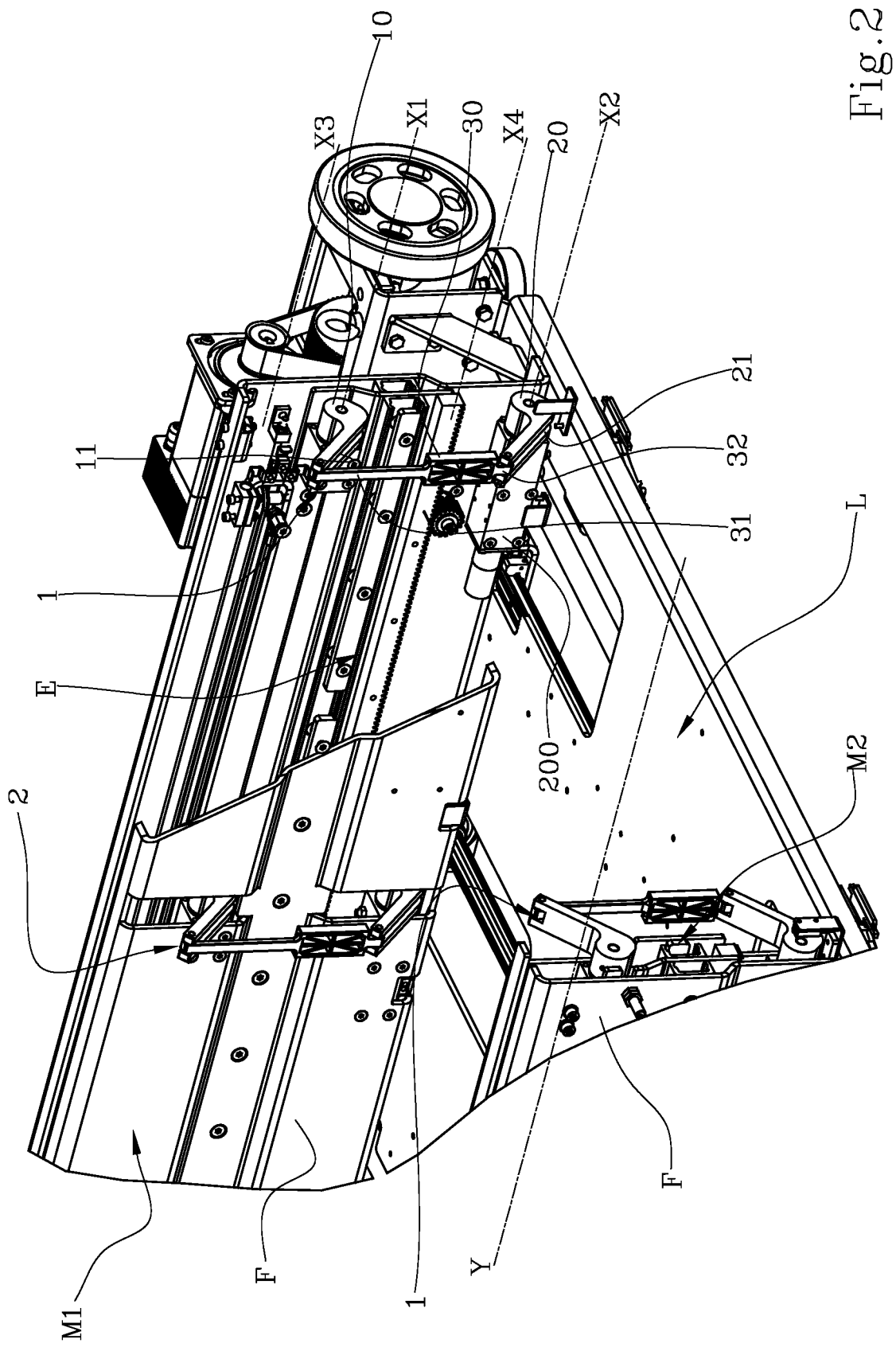
FIG. 2 shows the vehicle of FIG. 1 in an intermediate configuration.
Figure 3:
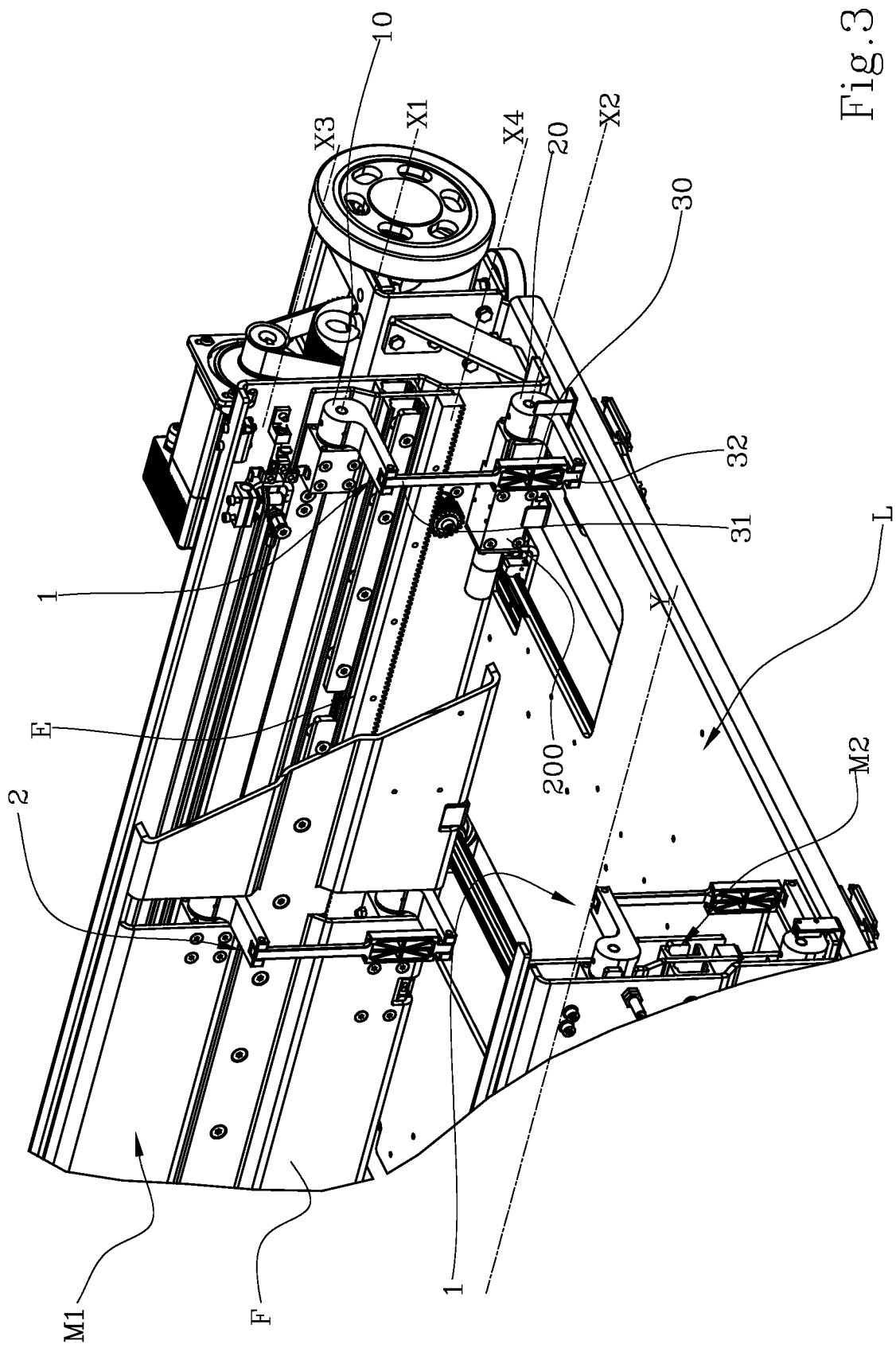
FIG. 3 shows the vehicle of FIG. 1 in a second operating configuration.

Each connecting rod (10,20) has a groove (11,21) profiled in such a way as to house a respective end portion (31,32) of the arm (30). Thereby, since the end portions (31,32) and the respective connecting rod (10,20) are pivoted in an end zone, in the inactive position of the connecting rods (10,20) the arm (30) can be arranged coplanar to the connecting rods themselves, as shown in FIG. 2. In the inactive position of the connecting rods (10,20), the end portions (31,32) of the arm (30) are housed in the respective grooves (11,21), while a central portion of the arm (30) is interposed between the two connecting rods (10,20). The inactive configuration of the connecting rods (10,20) is therefore particularly compact.

A second motor (E) is connected to the support body (F) to produce a displacement of the support body (F) along a longitudinal direction (Y) parallel to the axes of rotation (X1,X2,X3,X4). Such a second motor (E) is not illustrated in detail as it is available in various solutions known to those skilled in the art. In the embodiment depicted in the figures, the second motor (E) is in the form of a linear motor, provided with one or more sliding elements along the longitudinal direction (Y). One of such sliding elements is associated with the support body (F). In turn, the second motor (E) is connected to a supporting structure. Such a supporting structure may be of any nature. For example, in the embodiment depicted, the supporting structure is defined by a part of a vehicle (S), arranged to move along a predetermined path and to transfer one or more objects (O1,O2) along such a path. In this case, the movement device according to the present invention is used to load and unload objects from the mobile carrier (S).

Preferably, but not necessarily, the movement device is provided with a second barrier (2), associated with the support body (F) at a prefixed distance from the first barrier (1). For example, the second barrier (2) is associated with the support body (F) in a position such that it can be interposed between the two objects (O1,O2), as will be better described below.

The second barrier (2) is substantially equal to the first barrier (1) and comprises a first connecting rod, a second connecting rod and an arm associated with each other in a similar manner to the first barrier (1). The second barrier (2) is aligned with the latter along the axes of rotation (X1,X2, X3,X4). The second barrier (2) is operated synchronously with the first barrier (1). In particular, the second barrier is rotated about the same axes of rotation (X1,X2,X3,X4) as the first barrier (1). Preferably, the second barrier (2) is operated independently with respect to the first barrier (1) by motor means not illustrated, within the reach of those skilled in the art, similar to the motor means of the first barrier (1). For example, the second barrier (2) is integral in rotation with a drive shaft thereof of the first barrier (1), at the first or the second connecting rod thereof.

Preferably, but not necessarily, the movement device is provided with a third barrier (3), associated with the support body (F) at a prefixed distance from the first barrier (1) greater than the distance separating the first barrier (1) and the second barrier (2). For example, the second barrier is placed at an intermediate distance between the first barrier (1) and the third barrier (3). Basically, the second barrier (2) is interposed between the first barrier (1) and the third barrier (3). For example, the third barrier (3) is associated with the support body (F) in a position such that it can be on the opposite side of two objects (O1,O2) with respect to the first barrier (1), as will be better described below.

Also the third barrier (3) is substantially equal to the first barrier (1) and comprises a first connecting rod, a second connecting rod and an arm associated with each other in a similar manner to the first barrier (1). Also the third barrier (3) is aligned with the latter along the axes of rotation (X1,X2,X3,X4). The third barrier (3) is operated independently with respect to the first and the second barrier (1.2). In practice, depending on the size, shape and number of objects to be moved, the three barriers (1,2,3) can be operated synchronously or non-synchronously. In particular, also the third barrier is rotatable about the same axes of rotation (X1,X2,X3,X4) as the first barrier (1). The third barrier (3) is operated independently with respect to the first barrier (1) and the second barrier (2) by motor means not illustrated, within the reach of those skilled in the art.

The operating sequence for the displacement of two objects (O1,O2) from a waiting position to a position on board the vehicle (S) occurs in the following modes. Initially the two objects (O1,O2) are arranged side by side along the longitudinal direction (Y), next to the movement device.

Figure 4:
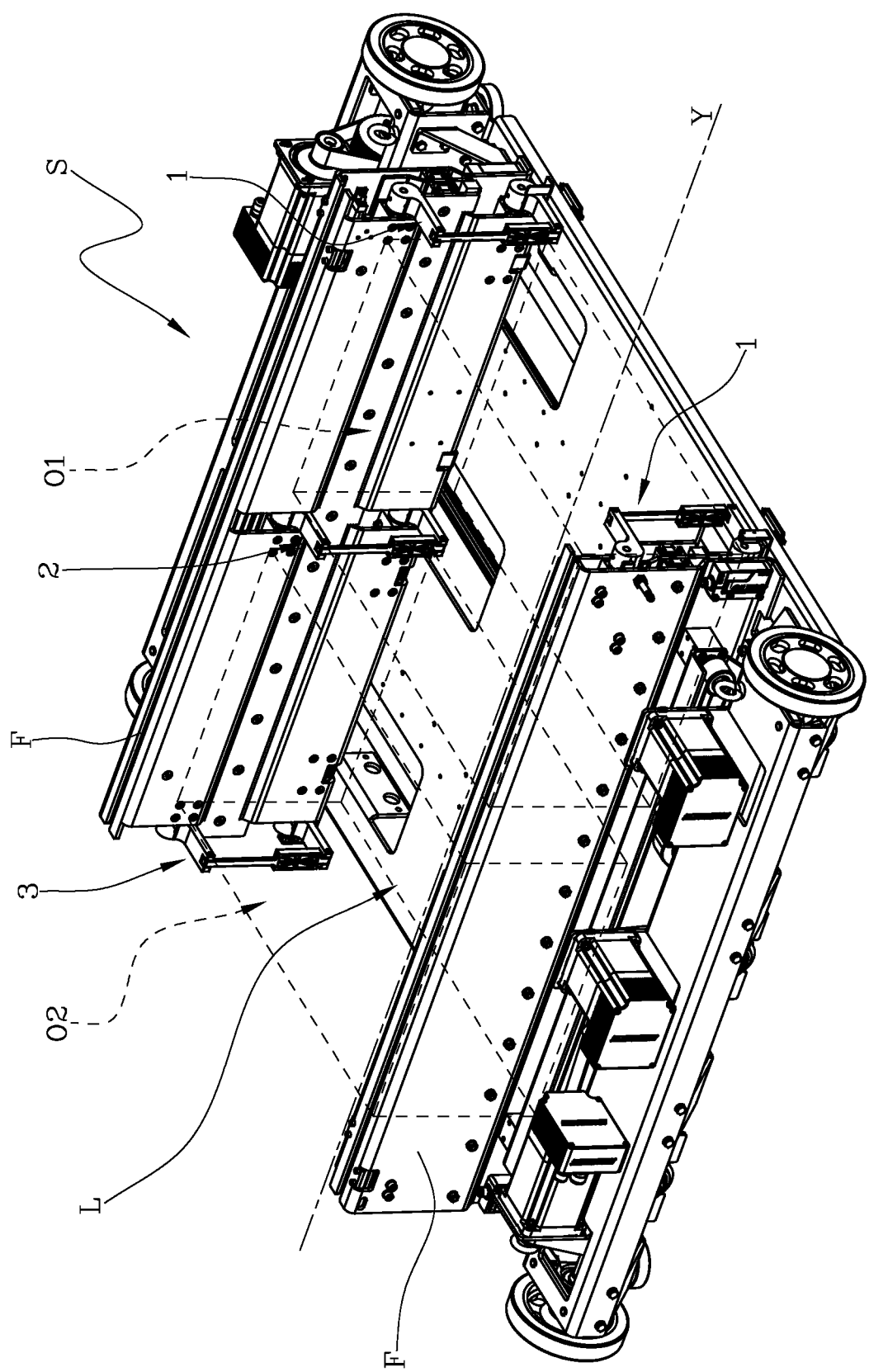
FIG. 4 shows an overall isometric view of a vehicle (S) for moving objects (O1,O2).

In an initial configuration, the support body (F) is on one side of the objects (O1,O2) and the barriers (1,2,3) are in the inactive position. Subsequently, the support body (F) displaces itself along the longitudinal direction (Y), passing alongside the objects (O1,O2) without interfering therewith, as the barriers (1,2,3) are still in the inactive position. Once the stroke end of the support body (F) is reached, substantially defined so as to bring the first barrier (1) on the opposite side of the objects (O1,O2), the barriers (1,2,3) are brought into the active position. From this position, the support body (F) displaces itself towards the initial position, dragging therewith the objects (O1,O2) by virtue of the interference between the barriers (1,2) and the objects (O1, O2) themselves (FIG. 4). For the opposite displacement, it is sufficient to reverse the order of the illustrated sequence. In the opposite displacement, the third barrier (3) interacts with the second object (O2), while the second barrier (2) interacts with the first object (O1).

In an embodiment not shown, the second barrier (2) may not be present. In such a case, to displace from the waiting position towards the vehicle (S), the second object (O2) displaces itself as a result of a drag operated thereon by the first object (O1). In essence, the first object (O1), dragged by the first barrier (1), comes into contact with the second object (O2), in turn dragging it in displacement. In the opposite displacement, the second object (O2), pushed by the third barrier (3), in turn pushes the first object (O1). In other words, the displacement of two objects, or obviously even a single object, can be achieved with a movement device provided with only two barriers.

In the preferred but not exclusive embodiment depicted, two movement devices operate simultaneously for the displacement of the two objects (O1,O2). In particular, a second movement device (M2) is arranged specularly to the first movement device (M1) described above, with respect to a vertical plane parallel to the axes of rotation (X1,X2,X3, X4).

As illustrated in FIG. 4, the first barriers (1) are opposite each other and symmetrical with respect to a vertical plane parallel to the axes of rotation (X1,X2,X3,X4). In the active position, shown in FIG. 5, the two first barriers (1) protrude towards each other, projecting from the respective support body (F). In such a position, the two barriers are capable of interfering with an object (O1) to allow the integral displacement thereof with the support bodies (F). The movements of the support bodies (F) are simultaneous with each other, as are the movements of the barriers (1).

In the inactive position, the first barriers (1) are instead retracted and flanked to the support body (F) thereof. In such an inactive position of the first barriers (1), the support bodies (F) can displace themselves along the longitudinal direction (Y) without interfering with the object (O1,O2). Similarly, the second barriers (2) and the third barriers (3) also move synchronously with each other and with respect to the first barriers.

As shown in FIG. 4, at least one movement device (M1) can be associated with a vehicle (S), movable along a prefixed path between different loading and unloading stations. Preferably, two movement devices (M1,M2), symmetrical and opposite with respect to a vertical plane parallel to the axes of rotation (X1,X2,X3,X4), are associated with a vehicle (S). The second movement device (M2) is similar to the first movement device (M1), but arranged symmetrically and opposite the latter with respect to a vertical plane parallel to the axes of rotation (X1,X2,X3,X4).

Vehicle (S) is intended as a device capable of displacing itself along a prefixed path in an autonomous and/or manually controllable manner. In a first example, the vehicle (S) could be in the form of a shuttle, movable along a path lying on a substantially horizontal plane. In a second example, the vehicle (S) could be in the form of an elevator, i.e., in the form of a platform movable along a vertical path, to reach different overlapping levels of an automated warehouse.

A vehicle of the type illustrated is particularly suitable for the automatic movement of objects inside an automated warehouse or logistics centre for sorting objects. The movement devices (M1,M2) are arranged on the sides of a loading space (L) included on board the vehicle (S). Thereby, by implementing the operating sequences described above, it is possible to transfer one or more objects inside or outside the loading space (L).

The motors and movements described in relation to the movement device according to the present invention, as well as the vehicle (S), can be managed, in a manner known in the art, by means of a general control module provided with separate functional modules (memory modules or operating modules), each responsible for controlling a given device or cycle of operations.

In substance, the general control module can be constituted by a single electronic device, programmed to carry out the functions described, and the various functional modules can correspond to hardware components and/or software routines being part of the programmed device.

Alternatively, or in addition, such functions can be performed by a plurality of electronic devices over which the aforesaid functional modules can be distributed.

The units can further rely on one or more processors for the execution of the instructions contained in the memory modules.

The units and the aforesaid functional modules can further be distributed over different local or remote computers on the basis of the architecture of the network in which they reside.

The invention claimed is:

1. A vehicle, comprising a loading space, characterised in that it comprises at least one movement device, comprising:
   a support body;
   a barrier, associated with the support body and movable between an active position, in which it protrudes from the support body to interact with an object to be displaced, and an inactive position, in which it is not able to interact with an object to be displaced;
   wherein the barrier comprises:
   a first connecting rod, associated with the support body rotatably about a first axis of rotation;

a second connecting rod, associated with the support body rotatably about a second axis of rotation parallel to the first axis of rotation;

an arm, rotatably connected to the first connecting rod and the second connecting rod at a third axis of rotation and at a fourth axis of rotation respectively parallel to the first and the second axis of rotation;

wherein the distance between the first axis of rotation and the third axis of rotation is equal to the distance between the second axis of rotation and the fourth axis of rotation;

a first motor, associated with the first connecting rod or the second connecting rod and arranged to rotatably operate the first or the second connecting rod about the respective axis of rotation between a rest position, in which the first connecting rod, the second connecting rod and the arm are flanked in a compact configuration, and an operating position, in which the connecting rods are inclined with respect to the arm in an extended configuration.

2. The vehicle according to claim 1, wherein the axes of rotation are substantially horizontal.

3. The vehicle according to claim 1, comprising a second motor connected to the support body and arranged to produce a displacement of the support body along a longitudinal direction parallel to the axes of rotation.

4. The vehicle according to claim 1, comprising a second barrier, associated with the support body at a prefixed distance from the first barrier, which is substantially equal to the first barrier and is aligned with the first barrier along the axes of rotation.

5. The vehicle according to claim 4, wherein the second barrier is operated synchronously or independently with respect to the first barrier.

6. The vehicle according to claim 4, comprising a third barrier, associated with the support body at a prefixed distance from the first barrier, greater than the distance separating the first barrier and the second barrier, wherein said third barrier is substantially equal to the first barrier and is aligned with the first barrier along the axes of rotation.

7. The vehicle according to claim 6, wherein the third barrier is operated synchronously with the first barrier.

8. The vehicle, comprising two movement devices according to claim 1, arranged symmetrical and opposite with respect to a vertical plane parallel to the axes of rotation, on the sides of the loading space.

9. A vehicle comprising a movement device, comprising:
a support body;
a barrier, associated with the support body and movable between an active position, in which it protrudes from the support body to interact with an object to be displaced, and an inactive position, in which it is not able to interact with an object to be displaced;
wherein the barrier comprises:
a first connecting rod, associated with the support body rotatably about a first axis of rotation;
a second connecting rod, associated with the support body rotatably about a second axis of rotation parallel to the first axis of rotation;
an arm, rotatably connected to the first connecting rod and the second connecting rod at a third axis of rotation and at a fourth axis of rotation respectively parallel to the first and the second axis of rotation, wherein the arm has two thinned portions, a first thinned portion is pivoted to the first connecting rod about the third axis of rotation; a second thinned portion is pivoted to the second connecting rod about the fourth axis of rotation; each connecting rod has a groove profiled in such a way as to house a respective end portion of the arm;
wherein the distance between the first axis of rotation and the third axis of rotation is equal to the distance between the second axis of rotation and the fourth axis of rotation;
a first motor, associated with the first connecting rod or the second connecting rod and arranged to rotatably operate the first or the second connecting rod about the respective axis of rotation between a rest position, in which the first connecting rod, the second connecting rod and the arm are flanked in a compact configuration, and an operating position, in which the connecting rods are inclined with respect to the arm in an extended configuration.

10. The vehicle of claim 9, wherein each of the first and second connecting rod has a groove profiled in such a way as to house a respective end portion of the arm.

* * * * *